US009074062B2

(12) United States Patent
Satpathy et al.

(10) Patent No.: US 9,074,062 B2
(45) Date of Patent: Jul. 7, 2015

(54) PROCESS FOR PREPARING HIGH MELT STRENGTH PROPYLENE POLYMERS

(75) Inventors: Umasankar Satpathy, Gujarat (IN); Ajit Behari Mathur, Gujarat (IN)

(73) Assignee: RELIANCE INDUSTRIES LTD., Mumbai (IN)

( * ) Notice: Subject to any disclaimer, the term of this patent is extended or adjusted under 35 U.S.C. 154(b) by 95 days.

(21) Appl. No.: 13/879,296

(22) PCT Filed: Oct. 11, 2011

(86) PCT No.: PCT/IN2011/000707
§ 371 (c)(1),
(2), (4) Date: Jun. 26, 2013

(87) PCT Pub. No.: WO2012/049690
PCT Pub. Date: Apr. 19, 2012

(65) Prior Publication Data
US 2013/0267636 A1    Oct. 10, 2013

(30) Foreign Application Priority Data
Oct. 14, 2010    (IN) .......................... 2860/MUM/2010

(51) Int. Cl.
*C07F 9/48*    (2006.01)
*C08K 5/00*    (2006.01)
(Continued)

(52) U.S. Cl.
CPC .............. *C08K 5/04* (2013.01); *B29K 2023/12* (2013.01); *B29C 51/02* (2013.01); *C08F 255/02* (2013.01);
(Continued)

(58) Field of Classification Search
CPC .... C08F 255/02; C08F 222/1006; C08F 8/00; C08F 8/50; C08F 8/06; C08F 2810/10; C08F 110/06; C08F 2500/09; C08F 2500/11; C08F 2500/12; C08F 2500/17; C08L 23/12; C08L 51/06; C08L 2312/00; B29C 47/0009; B29C 51/02; B29K 2023/12; C08K 5/04
USPC ............... 524/126, 576, 151, 400; 525/11, 27
See application file for complete search history.

(56) References Cited

U.S. PATENT DOCUMENTS 383,431 A    5/1888    Bennett
3,318,976 A   5/1967    Short
(Continued)

FOREIGN PATENT DOCUMENTS

CN    101092500 A    12/2007
CN    101148490 A    3/2008
(Continued)

OTHER PUBLICATIONS

Wang et a., "Chemical Modification of Polypropylene with Peroxide/Pentaerythritol Triacrylate by Reactive Extrusion", Journal of Applied Polymer Science, vol. 61, 1395-1404 (1996).*
(Continued)

*Primary Examiner* — William Cheung
(74) *Attorney, Agent, or Firm* — Harness, Dickey & Pierce, P.L.C.

(57) ABSTRACT

A process for preparing high melt strength propylene polymers is provided. The process comprises: blending base propylene polymers with 0.1 to 1% w/w of polyfunctional acrylate monomer, in the presence of 10 to 50 ppm organic peroxide and 0.2 to 20% w/w of an additive such as stabilizer, acid neutralizer, antioxidants or lubricants. The high strength modified propylene polymers obtained have 30 to 60% of increased melt strength than that of the base propylene polymers.

11 Claims, 3 Drawing Sheets

(51) Int. Cl.
| | |
|---|---|
| *B32B 27/30* | (2006.01) |
| *C08G 63/48* | (2006.01) |
| *C08G 63/91* | (2006.01) |
| *C08L 67/00* | (2006.01) |
| *C08K 5/04* | (2006.01) |
| *C08F 255/02* | (2006.01) |
| *B29C 47/00* | (2006.01) |
| *C08L 51/06* | (2006.01) |
| *C08L 23/12* | (2006.01) |
| *B29K 23/00* | (2006.01) |
| *B29C 51/02* | (2006.01) |
| *C08K 5/14* | (2006.01) |

(52) U.S. Cl.
CPC .............. *B29C 47/0009* (2013.01); *C08K 5/14* (2013.01); *C08F 2810/10* (2013.01); *C08L 51/06* (2013.01); *C08L 23/12* (2013.01)

(56) References Cited

U.S. PATENT DOCUMENTS

| | | | |
|---|---|---|---|
| 3,970,722 | A | 7/1976 | Ogihara et al. |
| 4,451,589 | A | 5/1984 | Morman et al. |
| 4,916,198 | A | 4/1990 | Scheve et al. |
| 5,047,485 | A | 9/1991 | DeNicola, Jr. |
| 5,200,439 | A | 4/1993 | Asanuma |
| 5,414,027 | A | 5/1995 | DeNicola, Jr. et al. |
| 5,416,169 | A | 5/1995 | Saito et al. |
| 5,439,949 | A | 8/1995 | Lucas et al. |
| 5,447,985 | A | 9/1995 | DeNicola, Jr. et al. |
| 5,541,236 | A | 7/1996 | DeNicola, Jr. et al. |
| 5,554,668 | A | 9/1996 | Scheve et al. |
| 5,591,785 | A | 1/1997 | Scheve et al. |
| 5,731,362 | A | 3/1998 | Scheve et al. |
| 5,804,304 | A | 9/1998 | Williams et al. |
| 6,306,970 | B1 | 10/2001 | Dang et al. |
| 6,444,722 | B1 | 9/2002 | Dang et al. |
| 6,664,317 | B2 | 12/2003 | King, III |
| 6,774,186 | B2 | 8/2004 | Walton |
| 8,399,536 | B2 | 3/2013 | Abata et al. |
| 2006/0167128 | A1 | 7/2006 | Olivier et al. |
| 2010/0113637 | A1 | 5/2010 | Abata et al. |

FOREIGN PATENT DOCUMENTS

| | | | |
|---|---|---|---|
| EP | 190889 | A2 | 8/1986 |
| EP | 384431 | B1 | 11/1994 |
| WO | WO-9749759 | A1 | 12/1997 |
| WO | WO 99/27007 | * | 6/1999 |
| WO | WO-9927007 | A1 | 6/1999 |
| WO | WO-2009003930 | A1 | 1/2009 |
| WO | WO-2010007671 | A1 | 1/2010 |
| WO | WO-2010076701 | A1 | 7/2010 |

OTHER PUBLICATIONS

International Search Report for PCT/IN2011/000707 (in English) mailed Mar. 22, 2012; ISA/CN.

The Effect of Long Chain Branching on the Processability of Polypropylene in Thermoforming, by Gotsis A.D. Zeevenhoven B.L. F.; Hogt, A.H., published in Polymer Engineering and Science on May 1, 2004.

M. Ratzsch, Pure Appl. Chem., A36, 1759 (1999)—Abstract only provided by R.K. Dewan.

Chemical Modification of Polypropylene with Peroxide/Pentaerythritol Triacrylate by Reactive Extrusion Xiaochuan Wang, Costas Tzoganakis, and Garry 1. Rempel Department of Chemical Engineering, University of Waterloo, Waterloo, Ontario N2L 3G1, Canada, Journal of Applied Polymer Science, vol. 61, 1395-1404 (1996).

Molecular Weight Changes in Irradiated Polypropylene N. S. Marans and L. J. Zapas, Washington Research Center, W. R. GTCW and Company, Clai-ksvilk?, Mayhnd 21089, Journal of Applied Polymer Science, vol. 11, 705-718 (1967), Clarksville.

A.J. DeNicola et al. "Radiation Treatment of Polypropylene." Polymeric Materials Science and Engineering, vol. 67. Fall Meeting, 1992.

Alexandros D. Gotsis and Qinfei Ke. "Comparison of Three Methods to Measure the Elongational Viscosity of Polymer Melts: Entry Flow, Fiber Spinning and Uniaxial Elongation.". SPE ANTEC Tech Papers, 1156. 1999.

V. V. DeMaio and D. Dong. "The Effect of Chain Structure on Melt Strength of Polypropylene and Polyethylene." SPE ANTEC Tech. Papers, 43, 1512. 1997.

* cited by examiner

PROCESS FOR PREPARING HIGH MELT STRENGTH PROPYLENE POLYMERS

This Application is a Section 371 National Stage Application of International Application No. PCT/IN2011/000707, filed Oct. 11, 2011, which claims priority from India Application No. 2860/MUM/2020 filed Oct. 14, 2010, the contents of which are incorporated herein in their entirety for all purposes.

FIELD OF DISCLOSURE

The present disclosure relates to high melt strength propylene polymers.

The present disclosure particularly, relates to a process to prepare high melt strength propylene polymers.

DEFINITION OF TERMS USED IN THE SPECIFICATION

The resistance of polymer melt to deformation is the melt strength under the given set of conditions. Conventional propylene polymers have a tendency to undergo shear thinning on stretching (extensional thinning) due to low entanglement density (polymer chains are free to move low resistance) as they are little inter twined, this generally occurs when the molecular weight of the polymer is not very high, molecular weight distribution is narrow and for polymer is not branched but linear. Incorporation of long chain branching in the polymer molecules enhances entanglement density and thus turns melt behavior of polymer from extensional thinning to extensional hardening i.e. enhancement of melt strength. Thus the melt strength of polyolefin such as polypropylene increases with long chain branching.

The change in melt strength or the deformation behavior under shear or tensile mode can be measured as resistance of material in terms of force or by using indicators of polymer melt modification like elastic modulus (G'), Tan δ and melt viscosity (MV) and the like.

Elastic modulus (G') is a measure of elasticity and viscous modulus (G") is defined as the ability of the material to dissipate the energy of the polymer melt as measured by dynamic rheological test. The ratio of G"/G' is the measure of material damping (Tan δ) i.e. higher the G' lower will be the Tan δ.

Enhancement of chain entanglement through incorporation of long chain branching and thus achieving high melt strength is possible through increase in molecular weight, molecular weight distribution and long chain branching. This can be monitored by determining the change in G' (increase), Tan δ (drop in value) and MV (increase).

Dynamic rheological analyzer has been used to determine the change in G'. Tan δ, MV and melt viscosity (η) at different frequencies (rad/sec).

Melt flow index (MFI) is the measure of resistance to flow of polymer melt under defined set of conditions (unit: dg/min). Being a measure at low shear rate condition, MFI is inversely related to molecular weight of the polymer and is used as indicator of melt strength enhancement of polypropylene during the course of its modification. Change in melt strength as described in the embodiment is indicated through the change MFI which drops with the increase in molecular weight during incorporation of long chain branching.

Die swell is the ratio of extrudate diameter to die orifice diameter of a rheometer. This is an indicator of melt elasticity (as indicated by elastic modulus-G'), higher the die swell higher will be the melt elasticity.

The commercial polymers have heterogeneity in terms of molecular weight (MW) and therefore molecular weight distribution (MWD) is also accounted for understanding the molecular properties. Due to this heterogeneity, molecular weight averages are calculated as number average molecular weight (Mn), weight average molecular weight (Mw), z average molecular weight (Mz), z+1 average molecular weight (Mz+1) in an increasing order of molecular weight. The increase in Mz and Mz+1 are good indicator of incorporation of high molecular weight fractions in the polymer matrix with the chain branching through recombination of macro free radicals during modification.

The modification of polypropylene to achieve long chain branching is carried out using polyfunctional acrylate monomers, hence its bonding with polymer chains is established through infra-red analysis (FTIR) calculating carbonyl index (>C=O index) which is the ratio of carbonyl absorbance band (>C=O) and methyl absorbance band (—CH3) of polypropylene.

>C=O index=$A_{1735}/A_{841}$.

Flexural modulus (FM) is the measure of the ratio of stress to corresponding strain in three point bending mode, within the elastic limit of polymer in solid state and is determined as per ASTM D 790.

Izod impact is the izod impact strength of the polymer in solid state while clamping the notched test piece in cantilever position (vertical). The test is carried out as per ASTM D 256.

BACKGROUND

Polypropylene (PP) exhibits higher melting point and lower density. It shows excellent chemical resistance, higher tensile modulus and is obtained at lower cost. This is the reason that it has already captured a major market share of commodity plastics. However commercial PP is constituted of highly linear chains with a relatively narrow molecular weight distribution. It shows poor processing characteristics in processes where extensional stiffing is predominantly required. In order for PP to be used by shaping processes like foaming, thermoforming, extrusion coating, blow molding etc, modifications are needed to enhance the strain hardening behavior (manifestation of high melt strength) of its melt. Even though a very broad (including bimodal) molecular weight distribution (MWD) can improve this behavior, strain hardening is most efficiently achieved by the addition of long chain branching (LCB). It is expected that if the melt strength behavior of PP is improved, its market position will become even more prominent, replacing thermoplastics in several applications.

Several commercial grades of (HMS-PP) are available, mostly developed using electron beam (EB) irradiation [M. Ratzsch, Pure Appl. Chem., A36, 1759 (1999)]. The EB irradiation causes scission of the PP chains, which is followed by some recombination reaction, leading to long chain branching as disclosed in A. J. DeNicola, A. F. Galambos, and M. D. Wolkowicz, "Radiation Treatment of Polypropylene." Polymeric Materials Science and Engineering, Volume 67, 106 (Fall Meeting, 1992); B. J. Scheve, J. W. Mayfield, and A. J. DeNicola, U.S. Pat. No. 4,916,198, Himont Inc. (1990) & A. J. DeNicola, European Patent No. 0384431B1, Himont Inc. (1989).

Basell's patents (WO:2010:076701, U.S. Pat. No. 4,916, 198) claim the production of long chain branching on PP by irradiating with an electron beam under oxygen free atmosphere followed by two heating steps to allow radical recombination and annihilation reaction. Some others companies have issued patents using electron beam processing, but so far there is not actual production other than Basell one. As a result of a research joint effort, IPEN, BRASKEM (the biggest Brazilian polymer producer) and EMBRARAD (the major Brazilian radiation processing center) developed a new process to produce HMS PP based on gamma processing.

Modified polypropylene commercially available as Profax [R] by Basell and Daploy[R] by Borealis, has been used successfully in foaming, thermoforming and extrusion coating processes.

Low decomposition temperature peroxides are also used to induce long chain branching. U.S. Pat. No. 5,047,485, Himont Inc. (1991) U.S. Pat. No. 5,416,169, Chisso (1994) disclose the use of peroxydicarbonates to modify PP at low temperatures.

WO Patent 97/49759 and WO Patent 99/27007 patents disclose reactive extrusion of PP with several peroxydicarbonates (PODIC).

The modifications in all these developments result in the grafting of long chain branches on the PP backbone. Even though most commercial HMS-PP is produced now by electron beam irradiation, the method of using peroxydicarbonates and reactive extrusion has recently regained interest, as it can be directly applied also by the foam manufacturer on commercial linear PP. It is well known that the melt strength of polyolefin increases with LCB. Ghijssels studied the relation between the melt strength (MS) and the melt flow index (MFI) for polyethylene grades with different degrees of LCB and found their melt strength increase with decreasing MFI. However, the MS of LDPE was found to be higher than the one of LLDPE and HDPE for the same MFI by a factor of at least two as referred in V. V. De Maio and D. Dong, "The Effect of Chain Structure on Melt Strength of Polypropylene and Polyethylene." SPE ANTEC Tech. Papers, 43, 1512 (1997) & A. D. Gotsis and Qinfei Ke, "Comparison of Three Methods to Measure the Elongational Viscosity of Polymer Melts: Entry Flow, Fiber Spinning and Uniaxial Elongation." SPE ANTEC Tech. Papers, 1156 (1999).

The higher melt strength of LDPE is due to long chain branches, which introduces strain hardening on stretching. This effect is stronger with the "tree-type" than with the "comb-type" long chain branching. No differences in strain hardening were seen by using different co-monomers (1-butene, 1-hexene and 1-octene) in LLDPE. It seems that all these side groups are too short to influence the elongational flow properties of the polymer melt & thus, the melt strength. In the case of PP, the melt strength also increases strongly with decreasing MFI as well as by widening the molecular weight distribution. Besides, branched polypropylenes obtained using electron beam irradiation were found to have ten times higher melt strength than a linear PP with the same MFI.

The elongational flow behavior of initially linear PP that is modified by reactive extrusion to obtain a long-chain-branched structure is affected by the molecular weight and molecular weight distribution of the precursor polymer. Broader precursor molecular weight distribution results in better thermoforming processing properties of the branched product. An optimum balance is found in these properties at a certain degree of branching, which also depends on the molecular weight and the molecular weight distribution of the polymer.

The elasticity of the polymer in all its manifestations is enhanced by long chain branching. Strain hardening index, an index defined here to characterize the degree of strain hardening of the melt, increases with the increase of the number of branches per molecule. The melt strength is enhanced by the addition of branches.

Some degree of long chain branching is beneficial for the foaming process. However, a very large number of branches per chain may reduce the foam ability of PP because they may reduce the strain at break of the melt. Peroxide-induced cross linking should also be avoided by the judicious choice of the peroxide and its amount used for the modification.

Conventional propylene polymeric materials have long been used in processes like thermoforming, blow molding, coating, etc requiring high melt strength which could be achieved by increasing molecular weight and broadening of molecular weight distribution. Molecular weight and molecular weight distribution can be modified in the polymerization process itself by choosing particular process conditions and catalyst type. However, typical propylene polymer resins, even those having high molecular weight and broad molecular weight distribution often cannot provide commercially desired levels of melt strength without additional processing. Techniques to improve melt strength have included irradiation of conventional flake polypropylene in reduced-oxygen environments, as described, in U.S. Pat. Nos. 4,916,198, 5,047,485, 5,414,027, 5,541,236, 5,554,668, 5,591,785, 5,731,362, and 5,804,304.

U.S. Pat. No. 5,047,485, discloses a process for producing a propylene polymer with free-end long chain branching by mixing a low-decomposition-temperature peroxide with a linear propylene polymer in the substantial absence of atmospheric oxygen, heating the resulting mixture to 120° C., and then deactivating substantially all the free radicals present in the propylene polymer. The processing temperature must be sufficient to decompose the low decomposition temperature peroxide but low enough to favor the recombination of the polymer fragments. It is further taught that processing temperatures above 120° C. provide a product with little or no branching (i.e. an essentially linear polymer).

U.S. Pat. No. 5,541,236 discloses a solid-state process for making a high melt strength propylene polymer by the formation of free-end long branches through irradiating linear propylene polymer material in a substantially oxygen-free environment (less than about 15% oxygen by volume) with high energy radiation to produce a substantial amount of molecular chain scission, maintaining the irradiated propylene polymer in the substantially oxygen-free environment to allow chain branches to form, and then deactivating substantially all the free radicals present in the irradiated propylene polymer material.

In the presence of free radicals formed from irradiation or peroxide reaction at higher temperatures, branching and chain scission (i.e. fragmentation) of polypropylene occur simultaneously, with chain scission mechanisms dominating due to first order kinetics. In contrast, the effect of free radicals in the presence of polyethylene leads to crosslinking by macro radical recombination (i.e., covalent bonds may be formed that link the crystalline and amorphous regions of polyethylene into a three-dimensional network).

A peroxide-initiated degradation of polypropylene may be used for production of controlled rheology resins with tailor-made properties, narrowed molecular weight distribution, lowered weight average molecular weight, and increased melt flow rate, as described, for example, in U.S. Pat. No. 4,451,589. The degradation or breaking of polypropylene chains as described therein results in an undesirable lowering of melt strength for the polymer (i.e., chain scission results in lower molecular weight and higher melt flow rate polypropylenes than would be observed were the branching not accompanied by scission).

The irradiation methods increase propylene polymer melt strength by creating polymer radicals during irradiation which then recombine to form long-chain branches in the controlled oxygen environment. Irradiation of syndiotactic and atactic metallocene-derived polymers has been described in U.S. Pat. Nos. 5,200,439 and 6,306,970, respectively. Irradiation of material having a Mw/Mn less than 2 generated by fragmentation of conventional polypropylene has been described in the Journal of Applied Polymer Science, Vol. 11, pp 705-718 (1967).

Other techniques for improving melt strength include irradiation of propylene polymer material in air, as described in U.S. Pat. No. 5,439,949. However, the increased oxygen levels favor chain scission reactions at the expense of branching reactions, which requires irradiation doses at or above the gelation point, thereby risking product quality and homogeneity.

Irradiating pellets of polymer material in air, as described in U.S. Patent Publication Number 2006/0167128, has been attempted to limit oxygen exposure, however, melt strength may still be adversely affected by chain scission occurring at the outer surface of the pellets.

Phenolic antioxidants have long been used to improve polymer stability under elevated temperature conditions, such as those typically experienced during extrusion, or during extended periods of storage. However, their use in irradiated compositions undermines enhanced melt strength by scavenging free radicals, thereby reducing the number of polymeric free radicals available to recombine to form long-chain branches. Moreover, irradiation of phenolic antioxidant-containing polymers can result in the formation of degradation products that impart undesirable color. Non-phenolic stabilizers have been used in the irradiation of conventional polyolefin materials to avoid such problems, as described in U.S. Pat. No. 6,664,317 and U.S. Provisional Patent Application No. 60/937,649, which has now published as International Application Publication No. WO2009/003930 and U.S. Patent Application Publication No. 2010/0113637, which has now issued as U.S. Pat. No. 8,399,536.

A significant challenge associated with production of high melt strength propylene materials via irradiation is the low melt flow rates typically required in the starting material to be irradiated. Low melt flow material (high viscosity) is normally used to ensure that the viscosity after irradiation is still sufficient for the needs of the application, as well as to provide long-chain radicals to help in melt strength development. However, such low melt flow rate material is also more difficult to process in plant equipment, and can result in production loss.

U.S. Pat. No. 3,970,722 discloses a method for preparing a modified polypropylene as a bonding agent by mixing crystalline propylene polymer, 0.1 to 5% organic peroxide with a half-life of one minute, and 0.1 to 7% modifying agent. The modifying agent may be either: (1) acrylic and methacrylic salts of Na, Ca, Mg, Zn, Al and Fe (III) or (2) compounds containing a phenol or benzyl group (e.g., 4-methacryloyl-oxymethylphenol). Because an excessive amount of organic peroxide may result in an increased melt flow index for the modified propylene polymer, it is taught that a non-modified crystalline propylene polymer in an amount of 50% or less may be added to the modified mixture in order to reduce the melt flow index to 120 or less. Also disclosed is that the organic peroxide should decompose completely during the preparation of the modified propylene polymer to prevent the decomposition of the non-modified crystalline propylene polymer added after modification.

An alternative method for introducing functional groups onto the polymer is described in U.S. Pat. No. 5,447,985. This process involves the addition of a peroxide (e.g. t-butyl peroxy maleic acid) having an activated unsaturation within the peroxide molecule and the optional addition of a co-agent (e.g., triallyl cyanurate, triallyl isocyanurate, ethylene glycol dimethacrylate, and trimethylolpropane trimethacrylate). The patent teaches that the activating group in the peroxide is a carboxylic acid group and that the melt flow index of the (co)polymer is significantly increased by the peroxide modification.

Grafting low molecular weight side chains onto peroxygenated polyolefins is known in the prior art. U.S. Pat. No. 6,444,722 discloses a process for making graft copolymers by treating the peroxygenated polyolefin in a substantially non-oxidizing atmosphere at a temperature of about 110° to 140° C. with at least one grafting monomer in liquid form and at least one additive to control the molecular weight of the side chains. It is disclosed that there is a need to control the molecular weight of the polymerized monomer side chains of polypropylene graft copolymers made from the per oxygenated polyolefin so that low molecular weight side chains are produced without adversely affecting the overall physical properties of the graft copolymer.

In U.S. Pat. No. 6,774,186, the free radical co-agent is a monomer or low molecular weight polymer having two or more functional groups with high response to free radicals. Typically, these functional groups are methacrylate, allyl or vinyl types. The free radical from peroxides enhances the rheological modification. Firstly, by peroxide induced allylic hydrogen abstraction from the co-agent, a lower energy state, longer-lived free radical is created. This free radical can then induce branching in the ethylene elastomer by hydrogen abstraction. Due to the lower energy state of the free radical, beta-scission and disproportionation of either polypropylene or ethylene elastomeric phase is less likely to occur. Secondly, the multifunctional co-agent can act as a bridging group between the polymer chains. Suitable co-agents for this application would include diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate (PETA), allyl methacrylate, N N'-m-phenylene bismaleimide, toluene bismaleimide-p-quinone dioxime, nitrobenzene, diphenylguanidine. Preferred co-agents are triallylcyanurate, 1,2 polybutadiene, divinyl benzene, and trimethylolpropane trimethacrylate (TMPTA). The co-agent is suitably present in an amount that is within the range of about 100 to 10,000 parts per million by weight. The peroxide and co-agent can be added by any conventional means. Illustrative procedures include imbibing it onto polymer pellets prior to compounding, adding it to polymer pellets as the pellets enter a compounding apparatus such as at the throat of an extruder, adding it to a polymer melt in a compounding apparatus such as a Haake, a Banbury mixer, a Farrel continuous mixer or a Buss-co-kneader or injecting it into an extruder, at 100% active ingredients (i.e., neat) or optionally as a dispersion or solution in an oil, such as a processing oil, at a point where the extruder contents are in molten form.

Grafting short chain branches or functional groups onto semi crystalline polypropylene resins, however, has proven to be insufficient to enhance the melt strength of such resins. Poor melt strength of polypropylenes can be seen in properties such as, e.g., excess sag in sheet extrusion, rapid thinning of walls in parts thermoformed in the melt phase, low drawdown ratios in extrusion coating, poor bubble formation in extrusion foam materials, and relative weakness in large-part blow molding. In addition, the use of free radical generators, such as organic peroxides, having a highly concentrated peroxide content (i.e., greater than 400 mmoles/kg) must be carefully controlled in order to keep the degradation (e.g., increased melt flow rate) of the polypropylene resin to a minimum. Accurately metering such low levels of peroxide in grafted propylene production is very difficult even when an organic peroxide master batch with low peroxide content is used.

Therefore, to obviate the disadvantages associated with the prior art, a need is felt to produce melt strength propylene polymers using simple and cost effective process.

OBJECTS OF THE INVENTION

The main object of the present invention is to provide a process to improve the melt strength of a linear polypropylene.

Another object of the present invention is to provide a simple and cost effective process for preparing high melt strength polypropylene.

Further object of the present invention is to develop a high melt strength long chain branched polypropylene in such a way that the integrity of the branch structure remains intact even after multiple thermal cycles.

Yet another object of the present invention is to provide a process to control uniform branching distribution & prevent homo-polymerization of trifunctional acrylate monomers during the extrusion process & consequently improve grafting & branching efficiency along with having an overall impact on the process economy.

Yet another object of the present invention is to provide a process with broad processing parameters of polypropylene whilst trying to maintain satisfactory optical & mechanical properties required for target end products application.

Yet another object of the present invention is to achieve optimum melt rheological characteristics & relatively broad molecular weight distribution to make the product compatible for thermo formability/deep drawing.

A still further object of the present invention is to modify both the homo and copolymer of polypropylene with wide range Melt flow index.

SUMMARY OF THE INVENTION

In accordance with the present invention, there is provided a process for preparing high melt strength propylene polymers having melt strength 30% to 60% greater than that of the base propylene polymers, said process comprising: reactive blending of base propylene polymers, with 0.1 to 1% w/w of polyfunctional acrylate monomer, in the presence of 10 to 50 ppm organic peroxide, and 0.2 to 20% w/w of at least one additive, said additive selected from the group consisting of stabilizers, acid neutralizers, antioxidants and lubricants.

Typically, the base propylene polymers are selected from the group consisting of homopolypropylene, copolymers of propylene with $C_2$-$C_{20}$ alpha-olefin, random propylene copolymers, polypropylene block polymers and heterophasic block copolymer.

Typically, the alpha-olefins are selected from the group consisting of ethylene, 1-butene, 1-pentene, 1-hexene, methyl-1-butenes, methyl-1-pentenes, 1-octene and 1-decene.

Typically, the alpha-olefins content in the copolymer is in the range of 1-45% by weight of the co-polymer.

In a preferred embodiment of the present invention, the amount of polyfunctional acrylate monomer is in the range of 0.25% to 0.50% by weight of polymer.

Typically, the polyfunctional acrylate monomer is selected from the group consisting of pentaerythritol triacrylate (PETA), trimethylolpropane triacrylate TMPTA, hexadecylmethacrylate (HDMA), octadecylmethacrylate (ODA) and butylmethacrylate (BMA), preferably the polyfunctional acrylate monomer is selected from the group consisting of pentaerythritol triacrylate (PETA) and trimethylolpropane triacrylate TMPTA.

Typically, the peroxide is selected from the group consisting of benzoyl peroxide, lauroyl peroxide, t-butyl peroxybenzoate, 1,1-di-t-butylperoxy-2,4-di-t-butylcyclohexane, 2,5-dimethyl-2,5-di-(tert-butylperoxy)hexane (Luprox 101), 3,6,9-triethyl-3,6,9-trimethyl-1,4,7-triperoxonane, diacyl peroxides, peroxyketals, peroxyesters, dialkyl peroxides and hydro peroxides.

Typically, the peroxide is selected from the group consisting of 2,5-dimethyl-2,5-di-(tert-butylperoxy)hexane (Luprox 101) and 3,6,9-triethyl-3, 6,9-trimethyl-1,4,7-triperoxonane.

Typically, stabilizer is at least one selected from the group consisting of Tetrakismethylene, (3,5-di-t-butyl-4-hydroxy-hydroconnamate)methane (Irganox-1010), Tris(2,4-di-t-butylphenol)phosphate (Irgafos168) and Tetrakis(2,4-di-t-butylphenol-4,4'-biphenylenediphosphonite (PEPQ).

Typically, the lubricant is calcium stearate.

BRIEF DESCRIPTION OF THE ACCOMPANYING DRAWINGS

DETAILED DESCRIPTION

Figure 1:
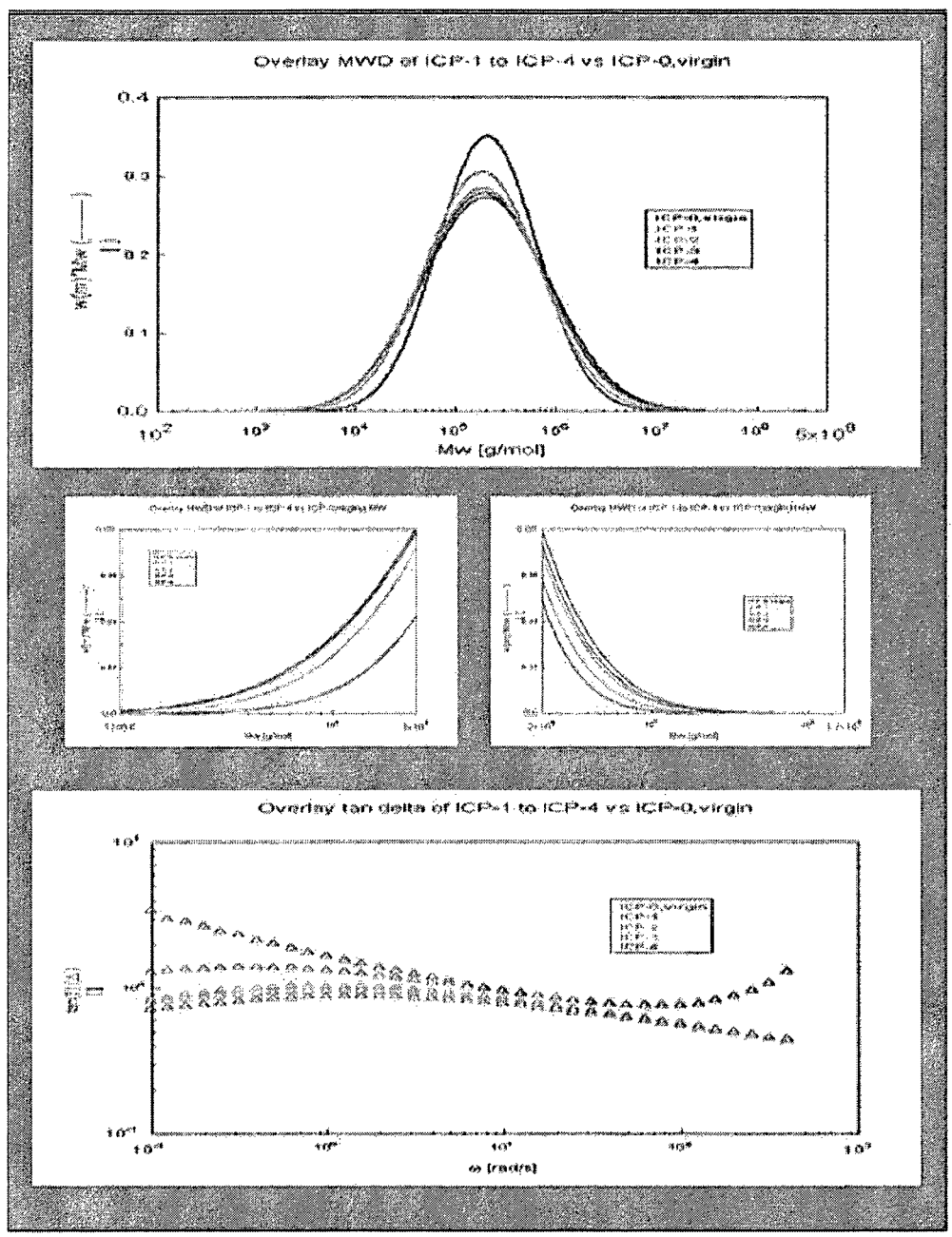
FIG. 1 illustrates the enhancement of the melt strength with the incorporation of long chain branching on polypropylene.

Controlled rheology polypropylene grades are established commodities in the polymer processing market. However new types, high melt strength polypropylene (HMS-PP) grades, are being introduced in the last two decades. The melt-strength properties of a polymer increase with molecular weight and with long chain branching due to the increase in the entanglement level. As PP is a linear polymer, the way to improve its elongation viscosity is by the production of a bimodal polymer.

Polypropylene compositions are used for a variety of applications in which the composition is subjected to thermoforming or foaming operation. Applications such as these require high melt strength polymer so that the sheet being thermoformed or the polymer being foamed maintains sufficient structural integrity during forming and provide desired product dimensional stability. If the melt strength is not high enough, the sheet can tear or become excessively thin (localized) during thermoforming, or the foam cells can burst during foaming. Unfortunately, polypropylene made by conventional processes has relatively poor melt strength, and thus has a very narrow temperature window for melt processing.

High melt strength polypropylene (HMS-PP) is an important product resulting from polypropylene modification and having wide range of applications. The linear structure of commercial polypropylene homopolymers/impact copolymers (PP or PP-ICP) is ill-suited for melt-state processing operations that impose extensional stiffening. This has been achieved in the present invention by generating a long-chain-branch (LCB) architecture through chemical modification & although a wide range of chemistry can be brought to bear on the problem, free radical methods are generally favored, since they can activate C—H bonds under solvent free conditions either in air or in a nitrogen atmosphere.

In general, reactive processing, as opposed to simple melt blending, is an efficient means for the continuous polymerization of monomers and for the chemical modification of existing polymers (e.g., controlled degradation, chain extension, branching, grafting, and modification of functional groups) in the absence of solvents. To chemically modify a polypropylene with reactive processing, by way of a graft copolymer, active grafting sites are formed on the propylene polymer backbone by treatment with peroxide or a free radical polymerization initiator. The free radicals produced on the polymer as a result of the chemical treatment initiate the attachment of a reactive monomer, at these sites. Polypropylenes chemically modified with a polar group show an improved adhesion to metals and may be used as a compatibilizer in immiscible blends.

It has now been conceived that inclusion of a suitable polyfunctional acrylate monomer together with a trace amount peroxide with the base polyolefin, such as polypropylene, or heterophasic block copolymer (PP-ICP) and coupled with suitable pair of antioxidants can increase the melt strength in the resultant polymer product. Typically, such reactive blending (also known as reactive extrusion, reactive processing, or reactive compounding) in the bulk phase, without the use of diluents or solvents is via an interaction with free radical generators (e.g. peroxide). Preferably, the reactively blended propylene composition of the present invention demonstrates increased melt strength while avoiding or minimizing undesirable modifications such as a increase in melt flow index or the substantial degradation (e.g., visbreaking) of polypropylene such as through scission, or the like.

The present invention discloses a simple, straight forward, efficient & cost effective process which involves the peroxide-initiated grafting of multi-functional co-agents. This single-step process involves simultaneous PP fragmentation & cross linking, the balance of which controls the length, frequency & distribution of branches. The melt-state rheology of these derivatives have been studied under steady shear, oscillatory shear & extensional deformations & found co-agents used in the current invention are capable of generating long-chain-branching characteristics from a linear PP homopolymer & heterophasic block copolymer (impact copolymer: PP-ICP).

The current invention relates to a process where a trace amount (20-50 ppm) of peroxide with a relatively low level modifier or multifunctional co-agent (2500-5000 ppm) together in a formulation brings forth a dramatic change in melt rheological properties & also facilitates the controlled branching even at 20 to 30% lower concentration of multi-functional monomer used as modifier/co-agent which is not possible to achieve by modifier alone even at higher concentrations & thereby imparts an impact on the process efficiency and economy as well.

One of the main applications of the propylene polymer compositions produced in accordance with the present invention are the manufactured thick sheets for thermoforming which are deep drawable to make products used in domestic and industrial sectors. The moulded articles made from the propylene polymer compositions of the invention have good stiffness and high impact properties at ambient temperature.

The elongational viscosity of polymer melts plays an important role in many processing operations like film blowing, blow molding, foam expansion, fiber spinning and thermoforming. A polymer melt under expansion undergoes shear and strong elongational deformation, so this property is as important as shear viscosity and for processes such as thermoforming, film blowing or blow molding they even prevail over shear deformation. It is known that most polyolefins show strain hardening effect under melt expansion. This effect induces a so-called self healing effect which contributes to avoid necking, sagging and other shape deformation under intense flow, as it promotes homogeneous thickness on overall dimensions. The appearance of strain hardening in uniaxial elongation of polyolefins at high deformation rates is related to the degree of long-chain branching as it was clearly established for low density polyethylene (LDPE) as compared with polypropylene or other linear or short-chain branched polyethylenes. LDPE can be easily processed at comparatively very high take-up velocities in extrusion and blowing operations. The strain hardening is a very sensitive indicator of the influence of structural properties on the nonlinear behavior in elongational flow. The growing importance of PP stirred the study of their tensile properties in the melt, i.e. PP melt-strength (MS). Therefore, it is rather a challenge to produce HMS-PP by a simple & cost effective process via melt grafting of polyfunctional acrylate monomer as co-agent/crosslinker/modifier together in presence of trace amount of peroxide as initiator & effective facilitator for branching.

Preferred propylene polymers for use in the present invention are homo-PP, random propylene copolymers, or more preferably heterophasic block copolymers.

The copolymer of propylene, if used, may preferably include a random copolymer or an impact block copolymer, preferably copolymers containing at least 50% w/w propylene and $C_2$ to $C_{20}$ alpha-olefin. Preferred alpha-olefins for such copolymers include ethylene, 1-butene, 1-pentene, 1-hexene, methyl-1-butenes, methyl-1-pentenes, 1-octene, 1-decene, or combinations thereof. If any such copolymer or mixture is employed, it is preferable to use one having an alpha-olefin content of about 1 to 45% w/w. In one embodiment, the alpha-olefin content can be about 10 to 30% w/w.

The impact block copolymers may include distinct blocks of variable composition, each block containing a homopolymer of propylene and at least one of the above-mentioned alpha-olefins. Copolymers with propylene blocks are generally obtained by polymerization in a number of consecutive stages in which the different blocks are prepared successively, as described in U.S. Pat. No. 3,318,976.

Preferred co-agent are long chain polyfunctional monomer (PFM) being selected from acrylate family viz. pentaerythritol triacrylate (PETA) or trimethylolpropane triacrylate (TMPTA), hexadecylmethacrylate (HDMA), octadecylmethacrylate (ODA), butylmethacrylate (BMA) etc. in an amount from 0.1 to 1 wt % based on the weight of the polypropylene. However, it was observed that 0.25 to 0.6 wt % of the PFM is quite effective in presence of peroxide (20-50 ppm) to achieve target MFI via melt grafting process by reactive extrusion approach.

Initiators suitable for use in this disclosure include without limitation benzoyl peroxide, lauroyl peroxide, t-butyl peroxybenzoate, 1,1-di-t-butylperoxy-2,4-di-t-butylcyclohexane, diacylperoxides, peroxyketals, peroxyesters, dialkyl peroxides, hydro peroxides, or combinations thereof.

In an embodiment, the initiator is selected form the group consisting of 2,5-dimethyl-2,5-di-(tert-butylperoxy)hexane (Luprox 101) and TRIGANOX 301 (3,6,9-triethyl-3,6,9-trimethyl-1,4,7-triperoxonane) commercially available from Akzo Nobel.

Peroxide in the range of 10-50 ppm perform the job of modification showing enhancement in melt viscosity & crystallization temperature confirming HMS-PP formation.

Stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure. For example, the additives may be present in an amount from 0.2 wt. % to 20 wt. %, alternatively from 0.1 wt. % to 10 wt. %, alternatively from 0.1 wt. % to 2.0 wt. % based on the total weight of the composition. Stabilizers are selected from the group consisting of combinations such as Tetrakis-methylene(3,5-di-t-butyl-4-hydroxyhydroconnamate)methane (Irganox-1010) & Tris(2,4-di-t-butylphenol)phosphate (Irgafos168) combination or irganox-1010 & Tetrakis(2,4-di-t-butylphenol-4,4'-biphenylenediphosphonite (PEPQ) combination.

HMS-PP in accordance with the present invention is prepared by contacting a polypropylene, an acrylate-containing compound, and an initiator (i.e. peroxide). The components are subjected to reactive extrusion wherein the components are dry blended, fed into an extruder, and melted inside the extruder. The process may be carried out using a continuous mixer such as a mixer consisting of a intermeshing co-rotating twin screw extruder for mixing/melting the components of the HMS-PP and a single screw extruder or a gear pump for pumping. Reaction conditions may be varied as known to one of ordinary skill in the art with the aid of this disclosure. Following the reaction extrusion the melt may be used to form an end use article or may be pelletized and used subsequently to form an end use article.

In an embodiment, the resulting HMS-PP displays a reduced melt flow rate (MFI) when compared to neat polypropylene. The MFI may be reduced from 10% to 60%, alternatively from 20% to 60%, alternatively from 30% to 60% when compared to neat polypropylene. MFI as defined herein refers to the quantity of a melted polymer resin that will flow through an orifice at a specified temperature and under a specified load. The MFI may be determined using a deadweight piston Plastometer that extrudes polypropylene through an orifice of specified dimensions at a temperature of 230° C. and a load of 2.16 kg in accordance with ASTM D-1238. In an embodiment, an HMS-PP have a melt flow index (MFI) from 0.5 g/10 min. to 20 g/10 min., alternatively from 0.3 g/10 min. to 7 g/10 min., more preferably from 0.15 g/10 min. to 1.5 g/10 min. in comparison, neat polypropylene may have an MFI from 1.5 g/10 min. to 30 g/10 min., alternatively from 1.5 g/10 min. to 15 g/10 min., alternatively from 1.5 g/10 min. to 12 g/10 min. The reduced melt flow indicates increased melt strength of the HMS-PP.

In an embodiment of the present invention, the HMS-PP has an extrusion rate that is increased by greater than 5%, alternatively greater than 10%, alternatively greater than 20% when compared to neat polypropylene having higher melt flow index.

In an embodiment of the present invention, during reactive extrusion the modified PP i.e. HMS-PP exhibits no change in torque when compared to neat polypropylene in spite of higher melt flow index. The extruder torque is a measure of the resistance the extruder motor experiences as it conveys the composition.

In an embodiment of the present invention, the HMS-PP even with 2-3 fold reduced MFI is extruded at a reduced specific energy when compared to neat polypropylene. The specific energy is an important factor in the extrusion that refers to the amount of energy required to perform processing operation.

In an embodiment of the present invention, the HMS-PP although having 2-3 fold reduced MFI is extruded at a specific energy lowered by greater than 5%, alternatively greater than 10%, when compared to neat polypropylene with higher melt flow index.

In an embodiment of the present invention, the HMS-PP is extruded at a reduced torque even with 2-3 fold reduced MFI when compared to neat polypropylene with higher MFI. The extruder torque is a measure of the resistance the extruder motor experiences as it conveys the composition. In an embodiment, the extruder torque is reduced by greater than 5%, alternatively greater than 10%, when compared to neat polypropylene with similar melt flow rate.

In an embodiment, the HMS-PP/LCB-PP displays improved process ability when compared to neat polypropylene with similar melt flow rate. This improved process ability may be reflected by a reduction in extrusion melt pressure, extruder torque, energy expenditure, and increases in the extrusion rates for processing of the composition. For example, the HMS-PP extrude at a reduced melt pressure when compared to neat polypropylene with similar melt flow index. In an embodiment, the melt pressure is reduced by greater than 10%, alternatively greater than 30%, alternatively greater than 60% when compared to neat polypropylene with similar melt flow index. The HMS-PP display a reduced melt pressure due to the presence of long chain branching. The lower melt pressure of the HMS-PP results in a higher extrusion rate when compared to neat polypropylene with similar melt flow index.

In the reactive processing of the present invention, the individual components are combined in a mechanical extruder or mixer, and then heated to a temperature sufficient to form a polymer melt (i.e., above the melting point of polypropylene). The blended components are heated to a temperature above about 150° C. and below about 300° C., preferably above about 160° C. and below about 250° C.

The reaction mixture so prepared is kneaded and extruded using an extruder having L/D ratio as 25:1 to 45:1, in the temperature range of 170 to 270° C. The retention time of the molten mass in the barrel is controlled by selecting the suitable screw rpm depending on the type and amount of reactants, reaction temperature and L/D ratio of the extruder used for reactive modification. The screw rpm is set in such a way that the reacting molten mass of the polymer takes about 5 to 50 sec and preferably 5 to 30 sec to travel in the barrel. The feeding of reaction mixture is carried out with/without ultra pure nitrogen blanketing in the hopper in a controlled manner. It is preferred to starve feed the extruder using a controlled feed device. Strand die suitable for producing two or more strands and the auxiliary units for cooling the extrudate as well as a pelletizer are used to obtain granulated form of modified polymeric material. The size of the granules is maintained from 3 to 7 mm.

The base propylene polymer is contacted with the poly functional monomer (PFM) prior to thermal decomposition of the free radical generator. The current process of using a PFM, preferably from the acrylate family having three or more functional sites like pentaerythritol triacrylate (PETA) or trimethylolpropane triacrylate (TMPTA), together with a peroxide mix along with a PP matrix, does not need further preheating above ambient temperature & the composition is directly taken for reactive extrusion to achieve desired MFI. Preferably, the amount of PFM is in the range 0.1 to 0.6%, more preferably in the range 0.25 to 0.5%, based on the weight of the propylene polymer.

The HMS-PP are converted to end-use articles such as thermoforming sheets of different thickness & then further thermoformed successfully with retention of original texture of sheet & acceptable wall thickness distribution of different thermoformed auto products.

The details of the invention will further be explained by way of examples which do not limit the scope of invention. The individual reactants in the formulations as given in the examples are maintained in ppm and percentage by weight unless otherwise specified.

Example 1

500 g batch mixture of PP-ICP

Batch size: 500 g Matrix, PP-ICP & 30 ppm PEROXIDE: Pentaerythritol triacrylate (PETA: Modifier) variation 50% of the Polypropylene was blended with a concentrate of trifunctional monomer (i.e. termed as co-agent/modifier) containing peroxide with thorough mixing. In the subsequent step remaining part of polymer was added & mixed perfectly for uniform dispersion of modifier. Irganox-1010 (i.e. 0.05% w/w based on total matrix used for modification) & Irgafos-168 (i.e. 0.1% w/w based on total matrix) followed by 0.06% calcium stearate were added to the whole mass & blended. Hand mixing operation was repeated several times to ensure proper mixing. The extrusion of PP-ICP containing reactants was carried out on lab model Buss-co-kneader. The temperature in the different zones of the extruder was maintained as Z-1: 1700 C; Z-2: 2300 C; Z-3: 2500 C; & Z-4 (die zone): 2600 C with screw rpm as 90. The extruded material was quenched & palletized. The modified samples were characterized for MFI, MW, MWD & melt rheological characteristics as summarized in Table-1.

In this example, modifier concentration was optimized wherein the MFI showed a decreasing trend with increase of modifier concentration from 0.35% w/w to 4% w/w keeping other variables constant. The samples were characterized by MFI, melt rheology (melt viscosity—$\eta ini@0.1$ rad/s), dampening behavior (tan $\delta$), MW/MWD, thermal & FT-IR. The results were conclusive to confirm enhancement of melt strength with the incorporation of long chain branching on modification of PP as shown in Table-1 & figure-1. However, it was observed that with higher PETA concentration there is also increase in the possibility of formation of homopolymer of PETA along with branching of PP.

TABLE 1

Properties of modified PP in accordance with this invention

| Sample No. | PETA, % W/W | MFI dg/min | G' Pa | Viscosity (η), Pa·s at 0.1 rad/sec | Viscosity (η), Pa·s at 250 rad/sec | Mn ($10^5$) | Mw ($10^5$) | Mz ($10^6$) | Mz + 1 ($10^7$) | MWD | tan δ | Tc, °C. | >C=0 index |
|---|---|---|---|---|---|---|---|---|---|---|---|---|---|
| ICP-0 | 0 | 1.63 | 522 | 18823 | 540 | 1.08 | 3.99 | 1.47 | 0.52 | 3.70 | 3.5 | 119 | nil |
| ICP-1 | 0.35 | 0.51 | 1475 | 24221 | 512 | 0.788 | 4.34 | 2.37 | 1.15 | 5.50 | 1.3 | 128 | 0.32 |
| ICP-2 | 1.0 | 0.27 | 2872 | 37608 | 517 | 0.701 | 5.04 | 3.58 | 2.07 | 7.19 | 0.85 | 127 | 0.59 |
| ICP-3 | 2.0 | 0.19 | 3320 | 42724 | 528 | 0.683 | 5.35 | 4.12 | 2.52 | 7.83 | 0.81 | 127 | 1.24 |
| ICP-4 | 4.0 | 0.13 | 4347 | 53556 | 560 | 0.69 | 5.86 | 4.87 | 3.12 | 8.50 | 0.72 | 128 | 2.05 |

Example-2

Figure 2:
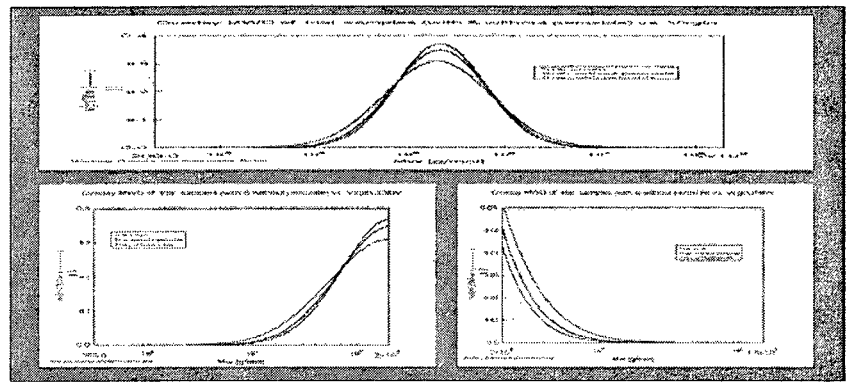
FIG. 2 illustrates the effect of a trace level of peroxide on the melt rheological properties of the modified polymer.
Figure 2:
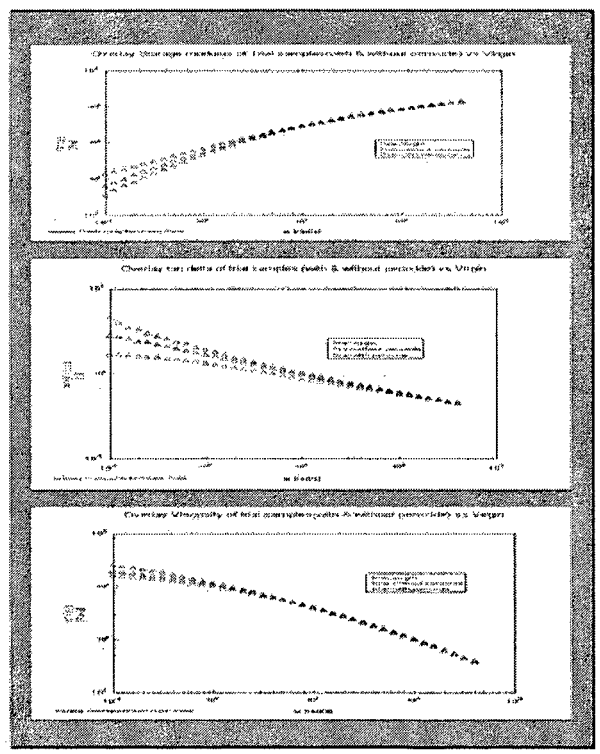

(Batch Size: 10 KG; Peroxide: 20 ppm, PETA (when use with peroxide): 0.4% w/w; PETA (without peroxide): 0.5% w/w; Irganox1010: 0.05% w/w; Irgafos-168: 0.1% w/w; calcium stearate: 0.06% w/w;)
The extrusion of PP-ICP (10 KG batch) was carried out on a twin screw extruder (Co-rotary-screw diameter—25 mm, L/D—25:1 and length 600 mm) using optimized recipe (Temperature profile: 95-250-260-260-260-260-258-263-263° C. & rpm 170) to examine the role of peroxide in reactive modification. It was found that presence of trace level of peroxide had significant impact on melt rheological properties of modified polymer. The process requires 10-20% lesser modifier to achieve desired MFI on modification in as compared to the modified polymer prepared without peroxide. The results are summarized in Table-2 & FIG. 2.

TABLE 2

Modification of PP-ICP with & without peroxide on pilot scale: Rheological & Thermal properties

| Trials | PETA (g) | Peroxide (g) | MFI g/10 min | G', Pa | η, Poise | tan δ | Mz + 1 | MWD | Tc, °C. |
|---|---|---|---|---|---|---|---|---|---|
| Trial-0 | nil | nil | 1.58 | 460 | 16872 | 3.52 | 4.50 | 3.50 | 119 |
| Trial-1 | 50 | nil | 0.70 | 664 | 19095 | 2.70 | 5.41 | 3.80 | 124 |
| Trial-2 | 40 | 0.20 | 0.42 | 1323 | 25710 | 1.70 | 11.0 | 5.45 | 128 |

Significant reduction in MFI and enhancement in storage modulus (G')/melt viscosity ($\eta$ini) were observed which indicate that chain branching is more pronounced with trace amount of peroxide in the formulation. Modified material showed higher shear sensitivity with high value of low shear viscosity (i.e. @low frequency) & indicated the presence of high MW fraction in the chain. The thermal characteristics of PP-ICP provide evidence of broadening of processing window.

Example-3

Batch size: 10 Kg of PP-ICP: Pentaerythritol triacrylate (PETA): 40 g; Irganox1010 (Primary antioxidant): 5 g; Irgafos-168 (Secondary AO): 10 g, calcium stearate (Cast): 6 g; Peroxide (Luperox101): 0.2 g)
10 kg batch was prepared with additives & modifier mixed in a high speed mixer to homogenize the mass before transferring to the feeder at ambient temperature and then extruded on a pilot scale twin screw extruder; the extrusion conditions are given in Table-3. Proper dispersion, mixing temperature, melt temperature & residence time (screw RPM) seem to be important to achieve lower MFI.

TABLE 3

ICP-PP reactive extrusion conditions

| Extruder Parameter | PP-ICP (1.5 MI) (Virgin) | As per recipe for modification |
|---|---|---|
| Main Drive RPM | 285 | 170 |
| Main Drive Torque % | 41 | 66-69 |
| Temp Z-2 to Z-9 (° C.) | 210-215-220-230-230-235-235-240 | 170-200-220-230-240-250-260-260 |
| Diverter Valve Temp | 245 | 265 |
| Die Plate Temp | 260 | 260 |
| Melt temp before DV | 254 | 256-261 |
| Melt temp after DV | 206 | 224-225 |
| Melt Press before DV (lim 150) | 141 | 125-129 |

TABLE 3-continued

ICP-PP reactive extrusion conditions

| Extruder Parameter | PP-ICP (1.5 MI) (Virgin) | As per recipe for modification |
|---|---|---|
| Melt press after DV | 132 | 107-111 |
| Differential Press | 9 | 16-18 |
| Feeder Output (Kg/hr) | 9.1 | 11-12 kg/h |
| MFI - Pellet | 1.63 | 0.6-0.8 |

Figure 3:
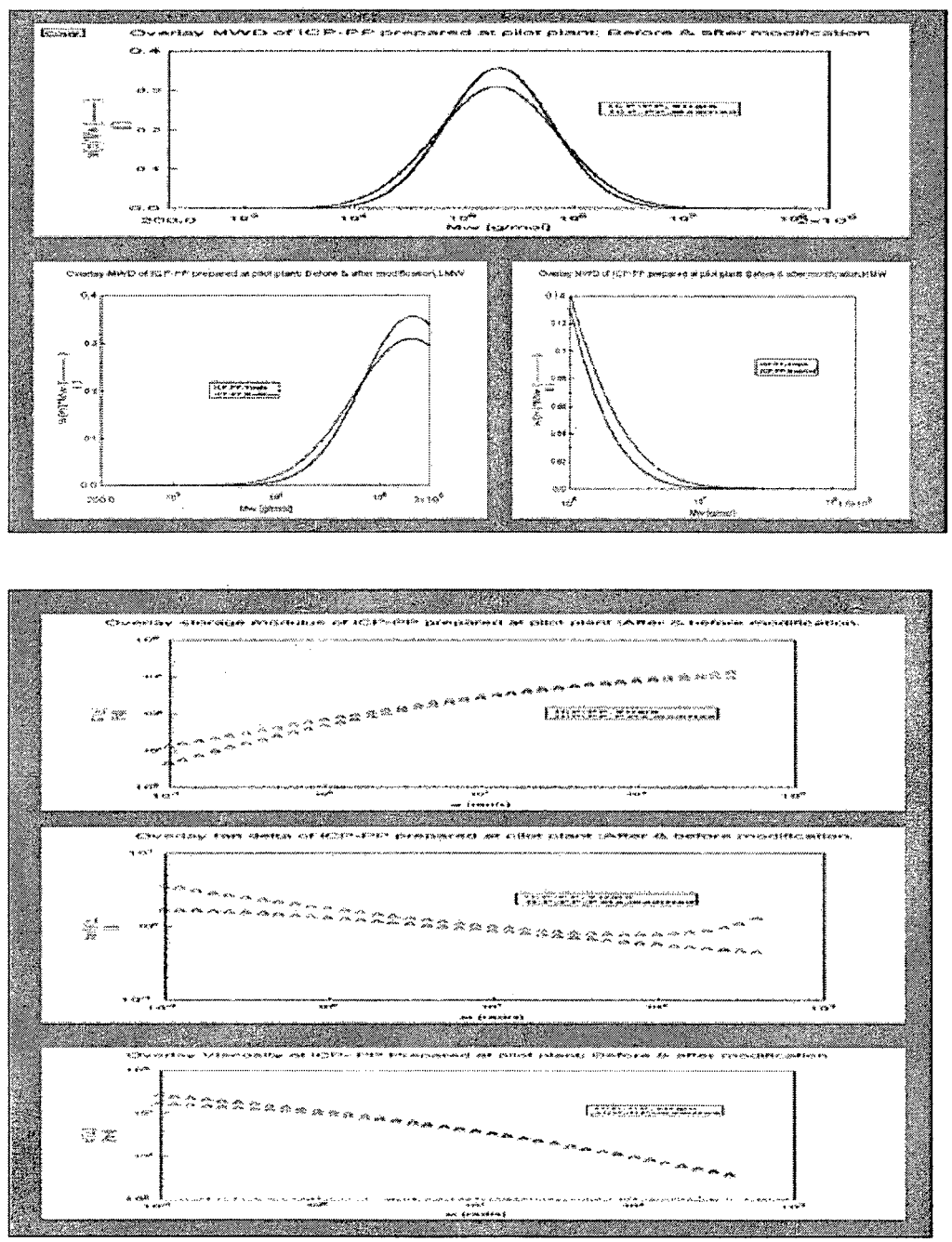
FIG. 3 illustrates the melt rheological properties of a polymer before and after modification.

HMS-PP modified by PETA showed higher die-swell & higher Tc compared to neat PP indicating broader MWD by branching (Table-4). Further High storage modulus (G') for HMS-PP at low shear rate & lower tan followed by high Molecular weight tail would impart high melt strength, especially due to branching (Table-4, FIG. 3). Modified polymer also shows improved balance of stiffness and toughness.

TABLE 4

Melt rheological & Thermal properties after & before modification

| Samples | MFI, g/10 min. | Die swell, % | G', Pa | η, Poise (Melt Viscosity) @ 0.1 rad/s | @ 250 rad/s | Tan δ | Mz + 1 (10⁶) | MWD | Tc, °C. | Irod Impact (J/M) | FM, (MPa) |
|---|---|---|---|---|---|---|---|---|---|---|---|
| PP-ICP (virgin) | 1.60 | 9.10 | 460 | 16872 | 534 | 3.52 | 4.52 | 3.50 | 111 | 406 | 954 |
| Modified PP-ICP | 0.80 | 32.50 | 1320 | 25869 | 517 | 1.69 | 11.30 | 5.31 | 123 | 685 | 1152 |

Thermoforming of the modified PP-ICP using 3 mm & 5 mm thickness sheets was satisfactory w.r.t. ease of forming and wall thickness distribution.

Example-4

The reaction mixture of PP-ICP of batch size 500 g was prepared using 0.4% PETA with & without peroxide along with normal doses of antioxidant Irganox-1010 (0.05% w/w) & Irgafos-168 (0.1%) as per procedure given in Example-1. Reaction mixture was then kneaded/extruded in a single screw extruder as described in Example-1. The feeding of the reaction mixture was controlled with the help of screw feeder. The extrusion was carried out in air environment under similar temperature profile & rpm as described in Example-1. MFI & melt characteristics of samples before & after modification were summarized in Table-5. Modified sample showed reduction in MFI compared to neat sample but reduction was significant in presence of very low concentration of peroxide. Overall results confirm long chain branching with modified sample but degree of branching was more with peroxide & PETA modified samples.

TABLE 5

Melt & Thermal characteristics of unmodified and modified PP samples

| S. No. | PETA, wt % | Peroxide (ppm) | MFI, g/10 min. | η, Poise @0.1 rads/s | Tan δ | Mz + 1 (10⁶) | MWD | Tc, °C. |
|---|---|---|---|---|---|---|---|---|
| ICP-0 | 0 | 0 | 1.55 | 17230 | 3.85 | 5.2 | 3.70 | 119 |
| ICP-1 | 0.4 | 0 | 1.15 | 19135 | 2.85 | 6.12 | 3.95 | 121 |
| ICP-2 | 0.4 | 25 | 0.38 | 25645 | 1.35 | 11.70 | 5.25 | 131 |
| ICP-3 | 0.60 | 0 | 0.59 | 23145 | 2.65 | 08.5 | 4.25 | 125 |
| ICP-4 | 0.6 | 25 | 0.21 | 31432 | 1.20 | 13.15 | 5.23 | 129 |

Example-5

A batch of 80 kg was prepared in a mixer using required quantity of PETA & peroxide in combination with Irganox-1010 & PEPQ as antioxidant pair including 0.06% w/w calcium stearate (Peroxide: 0.002%, Irganox-1010: 0.05%, PEPQ: 0.06%, PETA: 0.35w %) (Extrusion condition—Temperature: 170-265° C. & rpm: 170). The results of different batch sizes i.e. from 2 kg (LAB) to 80 kg (Pilot) were reproducible (Table-6).

TABLE 6

Modification of ICP-PP on LAB. & PILOT PLANT under different batch sizes: Melt rheological & thermal properties

| LAB/Trial | Batch size (kg) | PETA % W/W | MFI g/10 mint | Tc, °C. | η, Poise @ 0.1 rad/sec | tanδ | Mz + 1 (106) | MWD |
|---|---|---|---|---|---|---|---|---|
| ICP-PP(Virgin) | 10 | nil | 1.59 | 119 | 16782 | 3.52 | 4.52 | 3.55 |
| LAB-Modified | 2.0 | 0.35 | 0.45 | 130 | 24375 | 1.75 | 11.50 | 5.38 |
| Trial-10 | 10 | 0.35 | 0.61 | 128 | 23842 | 1.80 | 10.25 | 5.12 |
| Trial-80 | 80 | 0.35 | 0.63 | 127 | 24180 | 1.95 | 10.15 | 4.98 |

High shear viscosity (HSV) of modified PP-ICP was comparable with unmodified polymer indicating identical shear sensitivity (Table-7)

TABLE 7

HSV melt viscosity of Modified ICP-PP VS un modified ICP-PP

| Sample Identity Shear Rate(1/S) | Modified PP-ICP | Unmodified PP-ICP |
|---|---|---|
| | Viscosity (Pa-s) | |
| 48.6 | 1174 | 1086 |
| 97.3 | 747 | 738 |
| 304.0 | 345 | 345 |
| 595.9 | 215 | 216 |

TABLE 7-continued

HSV melt viscosity of Modified ICP-PP VS un modified ICP-PP

| Sample Identity Shear Rate(1/S) | Modified PP-ICP | Unmodified PP-ICP |
|---|---|---|
| | Viscosity (Pa-s) | |
| 802.6 | 175 | 175 |
| 997.2 | 148 | 150 |

Example-6

The mixing, kneading, extrusion and palletization of reaction mixture of both homo & impact copolymer matrix (i.e. homo-PP HPP having 3 & 12 MI including PP-ICP of 1.5 MI) were carried out on a Buss-co-kneader using required quantity modifier, peroxide & antioxidants along with Cast as in Example-1. The results showed that MFI reduced under optimum process condition both for homo-PP & PP-ICP. Melt rheological & thermal characteristics confirm long chain branch formation. Finally results clearly demonstrate that current process is capable to modify both homo & copolymer as shown in Table-8.

TABLE 8

Modification of homo-PP & PP-ICP by PETA & PEROXIDE: Rheological & thermal properties after & before modification

| Exp. Nos. | PETA, % W/W | Peroxide (ppm) | MFI, g/10 min | MV@230° C. | Tan δ | Tc,, ° C. |
|---|---|---|---|---|---|---|
| PP-ICP-0 | nil | nil | 2.00 | 3882 | 4.35 | 119 |
| PP-ICP-M | 0.40 | 20 | 0.52 | 15343 | 1.92 | 129 |
| HPP-3MI-0 | nil | nil | 3.50 | 9097 | 4.57 | 118 |
| HPP-3-M | 0.4 | 20 | 1..45 | 12365 | 2.25 | 126 |
| HPP-12MI-0 | nil | nil | 11.50 | 705 | 6.5 | 119 |
| HPP-12-M | 0.4 | 20 | 5.75 | 1350 | 3.5 | 124 |

Example-7

Influence of peroxide variation was examined on 10 kg batch formulation of PP-ICP using normal dose of Irgafos-168 (i.e. 0.10% w/w) & Irganox1010 (0.05% w/w) along with 0.06% calcium stearate in presence of fixed concentration of PETA (0.4% w/w) under narrow range peroxide variation from 15 ppm to 100 ppm. An optimum temperature was maintained as given in example-3. Results were summarized in Table-9.

TABLE 9

Modification of PP-ICP under different peroxide concentration: Melt rheological & thermal properties

| Trial no. | Peroxide, ppm | MFI | YI | η @ 0.1 rad/s, Poise | Tan δ | Tc, ° C. | MWD | Mz + 1 ($10^6$) |
|---|---|---|---|---|---|---|---|---|
| Trial-0 | Nil | 1.65 | −0.90 | 16892 | 4.45 | 119 | 3.22 | 3.83 |
| Trial-1 | 15 | 0.38 | −0.40 | 25920 | 1.70 | 129 | 5.35 | 11.00 |
| Trial-2 | 30 | 0.42 | −0.70 | 23245 | 1.87 | 128 | 5.14 | 9.07 |
| Trial-3 | 40 | 0.56 | −0.85 | 21768 | 1.86 | 128 | 5.21 | 10.87 |
| Trial-4 | 65 | 1.19 | −0.95 | 20543 | 2.75 | 126 | 4.97 | 8.66 |
| Trial-5 | 100 | 1.42 | −0.95 | 19879 | 3.12 | 126 | 4.77 | 8.66 |

Results showed that the modification is quite effective in presence of peroxide & MFI revealed a tendency of marginally increasing trend with increase of peroxide dose but 15-40 ppm range seems to be more reactive zone for branching in presence of modifier of course in a suitable temp profile.

Example-8

Batch=10 kg, PEPQ=0.06% w/w, Irganox-1010=0.05%; calcium stearate=0.06%

PP-ICP was modified on 10 kg batch formulation prepared as described in Example-1 & 3 using 0.26% w/w PETA and keeping other variables fixed. The temperature profile was same as described in Example-3. It was found that even at lower dose of modifier, MFI is in the range 0.85-1.25 g/10 min as shown in Table-10. Higher Tc & melt viscosity (MV) at lower shear rate confirm formation of branching.

TABLE 10

| Expt No. | PETA, % w/w | Peroxide (% w/w) | MFI, dg/min | YI, % | MV @ 230° C., Pa-s | Tc, ° C. | >CO index |
|---|---|---|---|---|---|---|---|
| ICP-0 | nil | 0 | 1.58 | 0.95 | 4725 | 118 | Nil |
| ICP-1 | 0.26 | 0.0025 | 1.00 | −0.42 | 8764 | 128 | 0.21 |

Batch = 10 kg;
PEPQ = 0.06% w/w;
Irganox-1010 = 0.05%;
CaSt = 0.06%

FT-IR data confirm the incorporation of PETA on to the matrix of PP during melt grafting process of co-agent & thereby facilitate branching in presence of peroxide reflected in higher Tc & Melt viscosity of modified PP-ICP.

Example-9

Batch Size: 500 g; Peroxide: 20 ppm, rpm=90 & cutter rpm: 120 Temperature profile: 160-230-250-265° C.

500 g PP-ICP was prepared as given in Example-1 & the batch was then extruded on a Buss-co-kneader using various antioxidant systems with different composition at two different PETA concentrations but keeping peroxide concentration as 20 ppm and maintaining same temperature profile & rpm as given in Table-11.

TABLE 11

Effect of stabilizer composition on Melt & Thermal characteristics before & after modification of PP-ICP

| Expt. Nos | Stabilizer com[position based on 500 g batch size, gms | | | PETA % w/w | MFI, g/10 min. | MV @ 230° C., Pa-s | Tc, ° C. |
|---|---|---|---|---|---|---|---|
| | Irganox-1010 | Irgafos168 | PEPQ | | | | |
| ICP-0-I | 0.25 | 0.50 | NIL | NIL | 1.55 | 4983 | 119 |
| ICP-1 | 0.25 | 0.50 | nil | 0.4 | 0.35 | 21399 | 128 |
| ICP-2 | 0.50 | 0.25 | nil | 0.40 | 0.55 | 15343 | 127 |
| ICP-3 | 0.25 | 0.50 | nil | 0.65 | 0.29 | 28041 | 129 |
| ICP-0-II | 0.25 | NIL | 0.30 | NIL | 2.00 | 3881 | 118 |
| ICP-5 | 0.25 | NIL | 0.30 | 0.40 | 0.60 | 12886 | 127 |
| ICP-6 | 0..50 | nil | 0.30 | 0.40 | 0.57 | 13822 | 128 |

Results clearly indicate that both Irganox-1010/Irgafos-168 & Irganox-1010/PEPQ pairs provide efficient combination of stabilization and desired MFI is achievable under optimum process conditions.

MFI of the modified polypropylene as shown in tables 1-11 clearly indicates 30 to 60% increase in the melt strength. Also, the order of change in MW, MWD & melt rheological characteristics properties are clearly indicative of such increase in the melt strength.

While considerable emphasis has been placed herein on the specific steps of the preferred process, it will be highly appreciated that many steps can be made and that many changes can be made in the preferred steps without departing from the principles of the invention. These and other changes in the preferred steps of the invention will be apparent to those skilled in the art from the disclosures herein, whereby it is to be distinctly understood that the foregoing descriptive matter is to be interpreted merely as illustrative of the invention and not as a limitation.

The invention claimed is:

1. A process for preparing high melt strength propylene copolymers having melt strength 30% to 60% greater than that of a base propylene copolymer, said process comprising:

reactive blending of the base propylene copolymer with 0.1 to 1% w/w of polyfunctional acrylate monomer, in the presence of 10 to 50 ppm organic peroxide and 0.2 to 20% w/w of at least one additive, said additive selected from the group consisting of stabilizers, acid neutralizers, antioxidants and lubricants.

2. The process as claimed in claim 1, wherein the base propylene copolymer is selected from the group consisting of copolymers of propylene with $C_2$-$C_{20}$ alpha-olefins, random propylene copolymers, polypropylene block polymers and heterophasic block copolymer.

3. The process as claimed in claim 2, wherein the alpha-olefins are selected from the group consisting of ethylene, 1-butene, 1-pentene, 1-hexene, methyl-1-butenes, methyl-1-pentenes, 1-octene and 1-decene.

4. The process as claimed in claim 2, wherein the alpha-olefins content in the copolymer is 1-45% by weight of the co-polymer.

5. The process as claimed in the claim 1, wherein the amount of polyfunctional acrylate monomer is in the range of 0.25% to 0.50% by weight of polymer.

6. The process as claimed in claim 1, wherein the polyfunctional acrylate monomer is selected from the group consisting of pentaerythritol triacrylate (PETA), trimethylolpropane triacrylate TMPTA, hexadecylmethacrylate (HDMA), octadecylmethacrylate (ODA) and butylmethacrylate (BMA).

7. The process as claimed in claim 6, wherein the polyfunctional acrylate monomer is selected from the group consisting of pentaerythritol triacrylate (PETA) and trimethylolpropane triacrylate TMPTA.

8. The process as claimed in claim 1, wherein the peroxide is selected from the group consisting of benzoyl peroxide, lauroyl peroxide, t-butyl peroxybenzoate, 1,1-di-t-butylperoxy-2,4-di-t-butylcyclohexane, 2,5-di methyl-2,5-di-(tert-butylperoxy)hexane (Luprox 101), 3,6,9-triethyl-3,6,9-trimethyl-1,4,7-triperoxonane, diacyl peroxides, peroxyketals, peroxyesters, dialkyl peroxides and hydro peroxides.

9. The process as claimed in claim 1, wherein the peroxide is selected from the group consisting of 2,5-dimethyl-2,5-di-(tert-butylperoxy)hexane (Luprox 101) and 3,6,9-triethyl-3,6,9-trimethyl-1,4,7-triperoxonane.

10. The process as claimed in claim 1, wherein the stabilizer is at least one selected from the group consisting of Tetrakismethylene(3,5-di-t-butyl-4-hydroxyhydroconnamate)methane (Irganox-1010), Tris(2,4-di-t-butylphenol) phosphate (Irgafos-168) and Tetrakis(2,4-di-t-butylphenol-4,4'-biphenylenediphosphonite (PEPQ).

11. The process as claimed in claim 1, wherein the lubricant is calcium stearate.

\* \* \* \* \*